US008676944B2

(12) United States Patent
Meleis

(10) Patent No.: US 8,676,944 B2
(45) Date of Patent: Mar. 18, 2014

(54) NETWORK MODELS, METHODS, AND COMPUTER PROGRAM PRODUCTS FOR MANAGING A SERVICE INDEPENDENT OF THE UNDERLYING NETWORK TECHNOLOGY

(75) Inventor: Hanafy Meleis, Weston, FL (US)

(73) Assignee: Trendium, Inc., Boulder, CO (US)

( * ) Notice: Subject to any disclaimer, the term of this patent is extended or adjusted under 35 U.S.C. 154(b) by 2784 days.

(21) Appl. No.: 09/910,555

(22) Filed: Jul. 20, 2001

(65) Prior Publication Data
US 2002/0010773 A1 Jan. 24, 2002

Related U.S. Application Data

(60) Provisional application No. 60/220,339, filed on Jul. 24, 2000.

(51) Int. Cl.
*G06F 15/173* (2006.01)
(52) U.S. Cl.
USPC ............................ 709/223; 709/230; 709/238
(58) Field of Classification Search
USPC .................. 709/223, 219, 217, 224, 230, 238
See application file for complete search history.

(56) References Cited

U.S. PATENT DOCUMENTS

| 4,348,554 | A |  | 9/1982 | Asmuth |  |
|---|---|---|---|---|---|
| 5,706,211 | A |  | 1/1998 | Beletic et al. |  |
| 5,790,802 | A |  | 8/1998 | Van Loon et al. |  |
| 5,809,233 | A |  | 9/1998 | Shur |  |
| 6,012,088 | A | * | 1/2000 | Li et al. | 709/219 |
| 6,038,594 | A |  | 3/2000 | Puente et al. | 709/217 |
| 6,049,819 | A |  | 4/2000 | Buckle et al. | 709/219 |
| 6,061,349 | A | * | 5/2000 | Coile et al. | 370/389 |
| 6,084,892 | A |  | 7/2000 | Benash et al. | 370/701 |
| 6,170,009 | B1 | * | 1/2001 | Mandal et al. | 709/223 |
| 6,487,594 | B1 | * | 11/2002 | Bahlmann | 709/225 |

(Continued)

FOREIGN PATENT DOCUMENTS

| DK | DE19832290 A1 | 1/2000 |
|---|---|---|
| JP | 07-226777 A | 8/1995 |

(Continued)

OTHER PUBLICATIONS

U.S. Appl. No. 08/762,737, filed Dec. 1996, Li et al.*

(Continued)

*Primary Examiner* — Dhairya A Patel
(74) *Attorney, Agent, or Firm* — Myers Bigel Sibley & Sajovec, PA

(57) ABSTRACT

Embodiments of the present invention provide network models, methods, systems, and computer program products for managing a service. For example, in some embodiments, a network model for managing a service includes an end service domain that associates the service with an end service provider. The end service domain includes a plurality of wholesale service domains that each includes one or more networks that provide traffic transport for the end service domain. One or more gateways are used to couple one of the wholesale service domains to another one of the wholesale service domains, and to perform protocol translation on traffic passing between the coupled wholesale service domains. In addition, one or more gateways are configured to couple a user to the end service domain, and are further configured to communicate with the user by a protocol associated with the service. A process domain provides an abstract representation of applications provided by the end service domain.

19 Claims, 5 Drawing Sheets

(56) References Cited

U.S. PATENT DOCUMENTS

| | | | |
|---|---|---|---|
| 6,898,570 B1 * | 5/2005 | Tedesco et al. | 705/14.36 |
| 2005/0216590 A1 | 9/2005 | Aubin et al. | |
| 2007/0043860 A1 | 2/2007 | Pabari | |

FOREIGN PATENT DOCUMENTS

| | | |
|---|---|---|
| JP | 11-275074 A | 10/1999 |
| WO | WO99/23784 | 5/1999 |
| WO | WO 99/66446 A1 | 12/1999 |

OTHER PUBLICATIONS

U.S. Appl. No. 08/962,485, filed Oct. 1997, Chou et al.*

Invitation to Pay Additional Fees for PCT/US01/23019, dated Jan. 11, 2002.

Vinoski, Steve, "CORBA: Integrating Diverse Applications Within Distributed Heterogeneous Environments," *IEEE Communications Magazine*. Feb. 1997, pp. 46-55.

International Search Report for PCT/US01/23019, dated Mar. 27, 2002.

Canadian Office Action issued on Nov. 26, 2009 in corresponding Canadian Patent Application No. 2,417,249 filed Jul. 20, 2001.

Japanese Office Action issued on Sep. 9, 2009 in corresponding Japanese Patent Application No. 2002-514953 filed Jan. 24, 2003.

Canadian Office Action Corresponding to Canadian Application No. 2,417,249; Dated, Feb. 28, 2012, 4 pages.

Japanese Office Action Corresponding to Japanese Patent Application No. 2011-007108; Dispatch Date: Jan. 10, 2013; Foreign Text, 2 Pages, English Translation Thereof, 1 Page.

* cited by examiner

NETWORK MODELS, METHODS, AND COMPUTER PROGRAM PRODUCTS FOR MANAGING A SERVICE INDEPENDENT OF THE UNDERLYING NETWORK TECHNOLOGY

RELATED APPLICATION

This application claims the benefit of U.S. Provisional Application No. 60/220,339, filed Jul. 24, 2000, the disclosure of which is hereby incorporated herein by reference.

BACKGROUND OF THE INVENTION

The present invention relates generally to the field of communication networks, and, more particularly, to managing a network service.

In recent years, regulatory forces worldwide have been working to cope with the need to modernize public networks to support the increasing number of data applications that the Internet embodies. Many users access the Internet through relatively low bandwidth public switched telephone network (PSTN) dial-up connections. Although this level of performance may satisfy many consumers, higher access speeds would almost certainly provide additional gratification.

Regulators in the United States and worldwide have recognized the value of creating a true "information society" and have taken steps to encourage, or even mandate, universal broadband access. Despite the demand for higher Internet access speeds from consumers, and the mandates of universal broadband access by regulatory agencies, it is unlikely that today's networks will evolve towards a universal Internet Protocol (IP) network.

The public voice network is generally considered the underpinning of modern communications. National policies in many industrialized countries reflect the need to ensure the stability of voice services, which are typically based on time division multiplexing (TDM) technology. Because IP networks generally do not provide the same degree of reliability and stability as current voice networks based on TDM, it is unlikely that IP networks will replace TDM voice networks anytime soon.

Accordingly, it is unlikely that today's communication networks will evolve towards a single worldwide network based on a single structure, owned by a single administration, and obeying a single technical discipline. Instead, communication networks may comprise access networks that support voice services and other, more advanced, data services, and are based on technologies like asynchronous transfer mode (ATM). Communication networks may also comprise core networks that support IP, ATM, frame relay, TDM, and various optical technologies based on dense waveguide division multiplexing (DWDM).

Network technologies, therefore, may diverge instead of converging. Consumers of network services, however, may demand a uniform interface irrespective of how diverse the underlying network technology may be. Service providers and network owners may be concerned with strategies for exploiting the potential of higher network access speeds without undermining the revenues and stability of current service offerings. Accordingly, there exists a need for improved systems and methods for managing a service that may allow both the service consumer and the service provider to benefit.

SUMMARY OF THE INVENTION

Embodiments of the present invention provide network models, methods, systems, and computer program products for managing a service. For example, a network model for managing a service comprises an end service domain that associates the service with an end service provider. The end service domain comprises a plurality of wholesale service domains that each comprise one or more networks that provide traffic transport for the end service domain. One or more gateways are used to couple one of the wholesale service domains to another one of the wholesale service domains, and to perform protocol translation on traffic passing between the coupled wholesale service domains. In addition, one or more gateways are configured to couple a user to the end service domain, and are further configured to communicate with the user by a protocol associated with the service. A process domain provides an abstract representation of applications provided by the end service domain. Advantageously, by modeling a service delivery environment as an end service domain that comprises network domains and process domains, the present invention may facilitate management of a service independent of the underlying network technology.

In further embodiments of the present invention, a service management system is communicatively coupled to the end service domain and comprises a plurality of software objects that represent resources in the end service domain and a policy database that comprises rules for associating requirements of the service with resources in the end service domain.

In particular embodiments of the present invention, the requirements of the service comprise service requirements associated with the user and business requirements associated with the end service provider.

Although embodiments of the present invention have been described primarily with respect to network model aspects of the invention, it will be understood that the present invention may also be embodied as methods, systems, and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
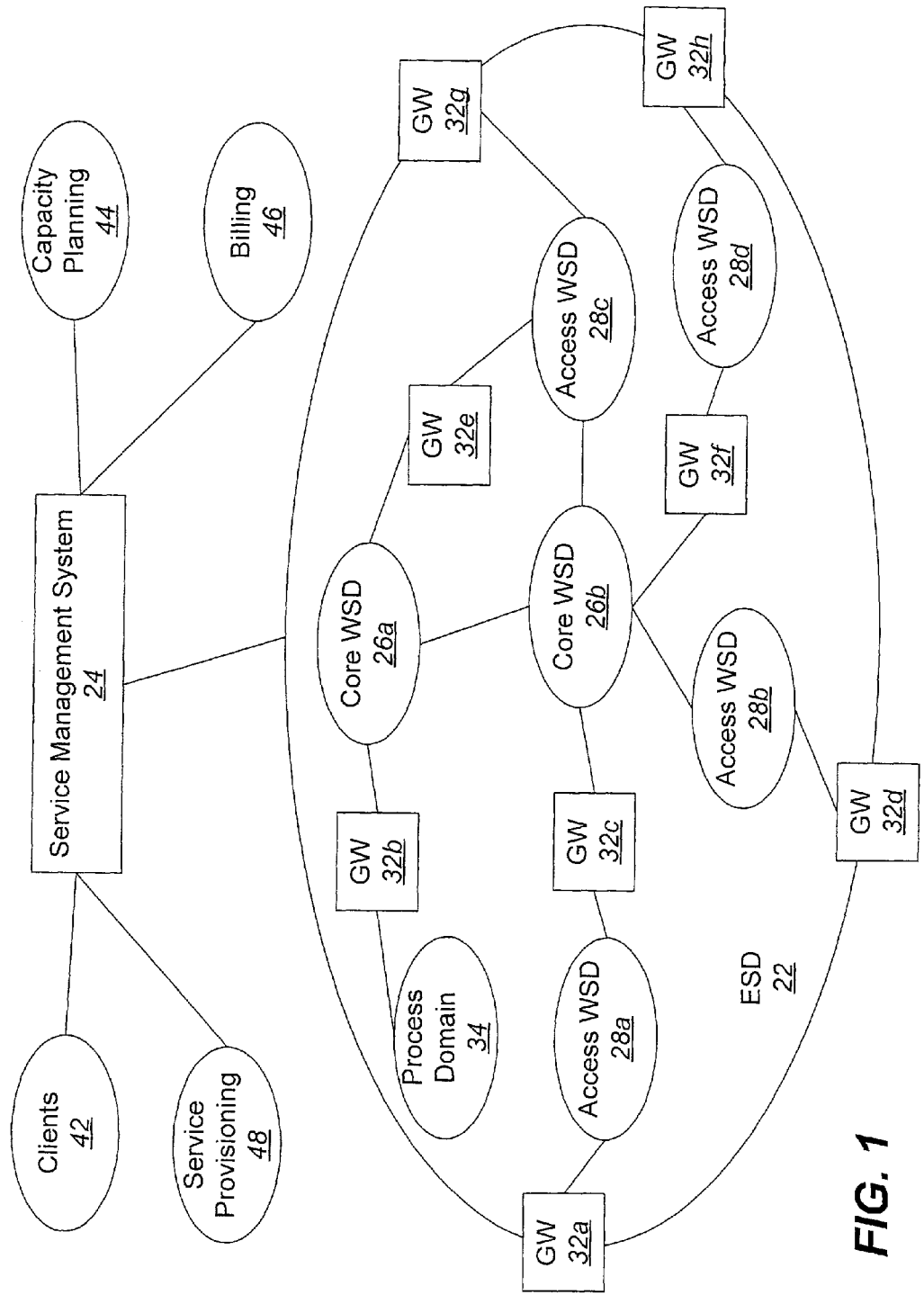
FIG. 1 is a block diagram that illustrates network model architectures in accordance with embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In many traditional networks, services are tied to a particular technology framework. It is anticipated, however, that services may eventually transcend networks. That is, a wide range of services may be provided on a network that comprises a combination of devices embracing a variety of architectures and protocols. A user may require services delivered in a protocol that is not supported by one or more sub-networks or core networks within the larger network domain. The present invention may provide network models, methods, systems, and computer program products for managing a service that are independent of the underlying network technology. Thus, the present invention may provide improved flexibility in service management that may allow services to be customized for consumers such that consumers may view a network as a personal service network.

Referring now to FIG. 1, a network model architecture, in accordance with embodiments of the present invention, comprises an end service domain (ESD) 22 that is communicatively coupled to a service management system 24. A service delivery environment may comprise one or more ESDs 22 that are each associated with an end service provider (ESP). An ESP represents a provider of a service to consumers, which may be, for example, end users and/or other service providers. Conventional services, such as Internet service, may be modeled as an ESD and retail carriers, such as local exchange carriers (LECs), inter-exchange carriers (IXCs), and Internet service providers (ISPs) may be represented as ESPs.

As shown in FIG. 1, ESD 22 comprises a plurality of core wholesale service domains (WSDs) 26a, 26b and access WSDs 28a, 28b, 28c, and 28d. Each WSD comprises one or more networks that provide the access and transport connections that are used by the ESD 22 and associated ESP. Moreover, each WSD may have a wholesale service provider (WSP) associated therewith. Each WSD may be viewed as an "interior ESD" in the sense that retail services to one provider may be wholesale services to another provider. Access WSDs 28a, 28b, 28c, 28d correspond to those WSDs that couple customers/users to the ESD 22 (i.e., those WSDs through which customers/users access the ESD 22). By contrast, core WSDs 26a, 26b correspond to those WSDs that are not used to couple customers/users to the ESD 22. Examples of WSDs include facility networks that are owned and/or operated by LECs and/or IXCs, as these networks may provide transport and access resources to logical service networks that overlay them.

WSDs (core and access) are connected to each other and to customers/users through devices called gateways (GWs). As shown in FIG. 1, the ESD 22 comprises eight gateways 32a, 32b, 32c, 32d, 32e, 32f, 32g, and 32h that are connected to various ones of the WSDs. More specifically, GWs 32a, 32d, 32g, and 32h connect customers/users to access WSDs 28a, 28b, 28c, and 28d, respectively, and are configured to communicate with the customers/users using a protocol associated with an ESD service. On the other hand, GWs 32b, 32c, 32e, and 32f connect WSDs to each other inside the ESD 22. GW devices may be embodied as translation devices that are configured to translate between protocols used by different ESDs and/or WSDs. Examples of conventional GW devices include, but are not limited to, those network devices that are used to link leased lines to IP networks, or ATM networks to PSTN networks. GW devices, in accordance with embodiments of the present invention, may be called "service switches" and/or "service points of presence (POPs)." These service-switch GW devices, when operated at the edge of the ESD 22, such as GWs 32a, 32d, 32g, and 32h, may be configured to analyze incoming traffic and to segregate the incoming user traffic according to application. When operated internal to the ESD 22, such as GWs 32b, 32c, 32e, and 32f, the service-switch GW devices may be configured to bridge dissimilar network protocols.

The ESD 22 further comprises a process domain 34 that provides an abstract representation of applications provided by the ESD 22. More specifically, the process domain 34 represents those network processes that a customer/user of the ESD 22 would recognize as an application provided by the network. For example, many TCP/IP networks include a service called the Domain Name System (DNS) that provides logical name-to-address translation. Network DNS servers that provide this service may be viewed as network processes. Network process resources may be located anywhere in the ESD 22, including interior to the WSDs. In accordance with embodiments of the present invention, these network processes are represented as the process domain 34.

The service management system 24 may communicate with the ESD 22 to collect, for example, performance, configuration, topology, timing, and/or traffic data therefrom. The data collected by the service management system 24 are stored in repositories for use by other applications. The repositories may be implemented as relational database management systems (RDBMS) that support the structured query language (SQL). It may be desirable to store the collected data in a SQL database to facilitate access of the collected data by other applications. Advantageously, applications may access a SQL database without having to know the proprietary interface of the underlying RDBMS.

Client applications 42 may communicate with the service management system 24 to access reports generated by the service management system 24 based on analyses of the collected data and to manage the services provided by the ESD 22 (e.g., determine whether a service provided by the ESD 22 is in conformance with an agreed upon quality of service). Capacity planning applications 44 may communicate with the service management system 24 to assist an administrator in shaping/configuring the topology/shape of the ESD 22 and/or to distribute traffic carried by the ESD 22. Billing applications 46 may communicate with the service management system 24 to generate bills based on analyses of the data collected from the ESD 22. Finally, service provisioning applications 48 may communicate with the service management system 24 to facilitate the introduction of new services into the ESD 22 or another ESD.

The service management system 24 and/or data processing system(s) supporting the client applications 42, the capacity planning applications 44, the billing applications 46, and the service provisioning applications 48 may be configured with computational, storage, and control program resources for managing a service, in accordance with embodiments of the present invention. Thus, the service management system 24 and the data processing system(s) supporting the client applications 42, the capacity planning applications 44, the billing applications 46, and the service provisioning applications 48 may each be implemented as a single processor system, a multi-processor system, or even a network of stand-alone computer systems.

Although FIG. 1 illustrates an exemplary network model architecture architecture, it will be understood that the present invention is not limited to such a configuration but is intended to encompass any configuration capable of carrying out the operations described herein.

Figure 2:
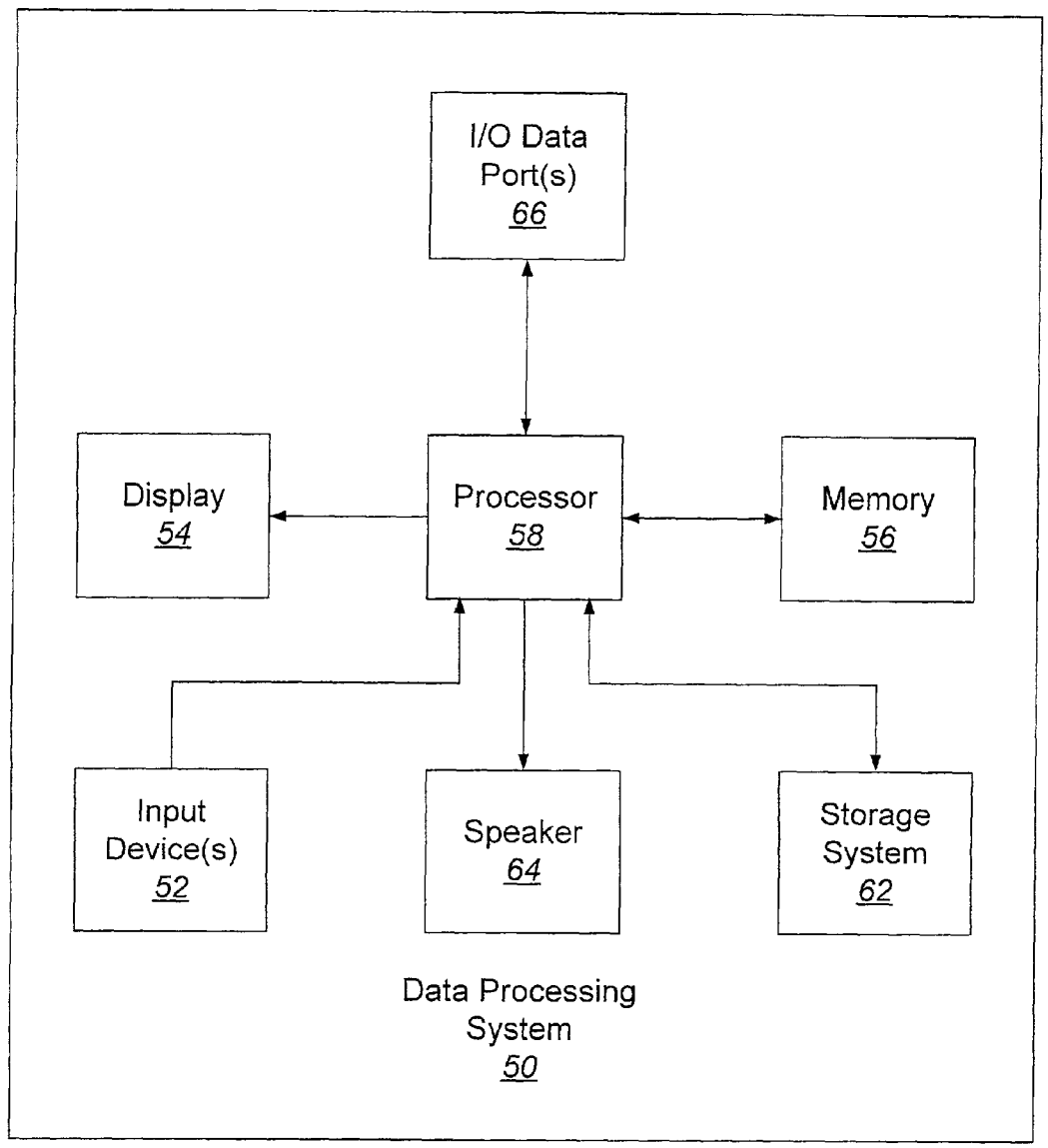
FIG. 2 is a block diagram that illustrates data processing systems in accordance with embodiments of the present invention.

Referring now to FIG. 2, an exemplary data processing system 50 architecture is illustrated, which may be used in embodiments of the service management system 24 and the data processing system(s) supporting the client applications 42, the capacity planning applications 44, the billing applications 46, and the service provisioning applications 48, in accordance with the present invention. The data processing system 50 may include input device(s) 52, such as a keyboard or keypad, a display 54, and a memory 56 that communicate with a processor 58. The data processing system 50 may further include a storage system 62, a speaker 64, and an input/output (I/O) data port(s) 66 that also communicate with the processor 58. The storage system 62 may include removable and/or fixed media, such as floppy disks, ZIP drives, hard disks, or the like, as well as virtual storage, such as a RAM-DISK. The I/O data port(s) 66 may be used to transfer information between the data processing system 50 and another computer system or a network (e.g., the Internet). These components may be conventional components such as those used in many conventional computing devices and/or systems, which may be configured to operate as described herein.

Figure 3:
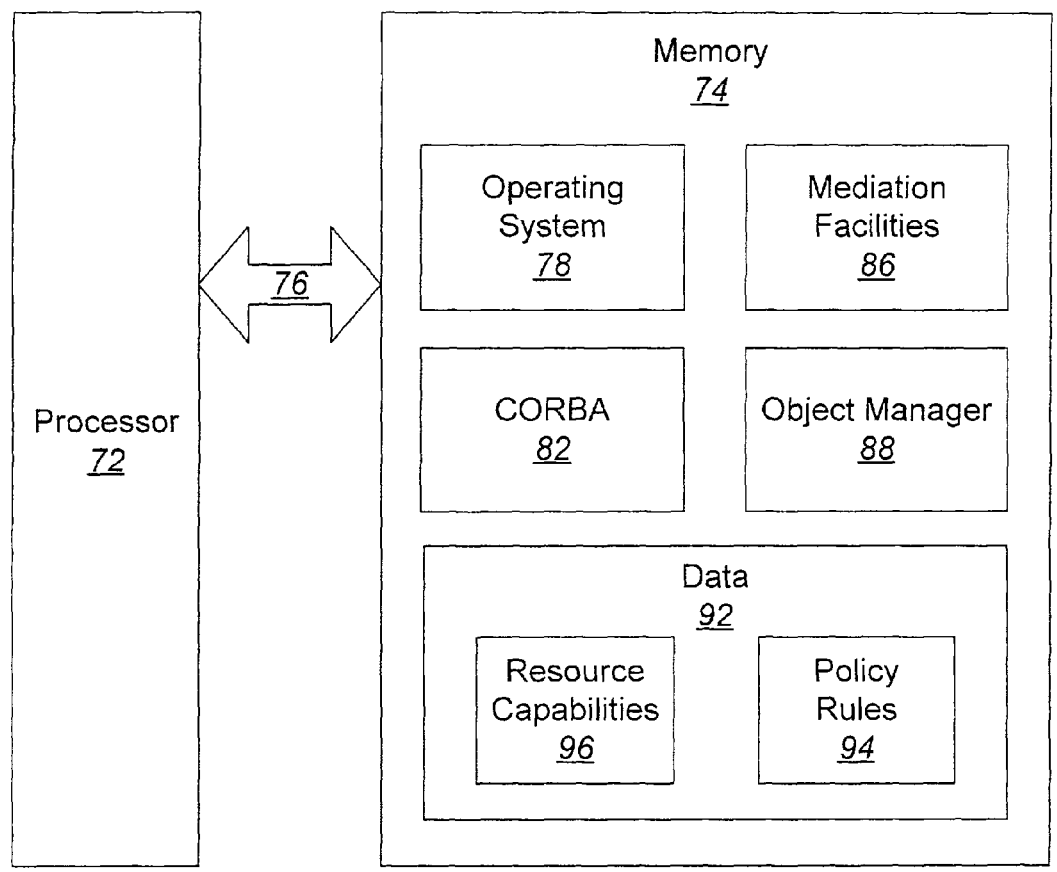
FIG. 3 is a software architecture block diagram that illustrates methods, systems, and computer program products for managing a service in accordance with embodiments of the present invention.

FIG. 3 illustrates a processor 72 and a memory 74 that may be used in embodiments of the service management system 24 in accordance with the present invention. The processor 72 communicates with the memory 74 via an address/data bus 76. The processor 72 may be, for example, a commercially available or custom microprocessor. The memory 74 is representative of the overall hierarchy of memory devices containing the software and data used to manage a service in accordance with embodiments of the present invention. The memory 74 may include, but is not limited to, the following types of devices: cache, ROM, PROM, EPROM, EEPROM, flash, SRAM, and DRAM.

As shown in FIG. 3, the memory 74 may contain up to five or more major categories of software and/or data: the operating system 78, the Common Object Request Broker Architecture (CORBA) program module 82, the mediation facilities module 86, the object manager program module 88, and the data module 92.

The operating system 78 controls the operation of the computer system. In particular, the operating system 78 may manage the computer system's resources and may coordinate execution of programs by the processor 72. The CORBA module 82 may be configured to allow the software modules in the memory 74 to be implemented as an object-oriented system and may facilitate communication between the various software objects. In addition, the CORBA module 82 may also allow the objects to be distributed across a heterogeneous network. For example, the objects may be distributed across different data processing systems in a network and yet appear to each other as if they were local. In a distributed object-oriented computer system, client objects may be given object handles to reference remote server objects. A remote object is an object whose class is implemented in a process that is different from the process in which the object handle resides. Moreover, a remote object may be implemented on a data processing system that is remote from the data processing system on which the object handle resides. An object handle identifies a remote, server object and may allow a client object to invoke member functions of the remote object. CORBA is an exemplary distributed object module that may be used in embodiments of the present invention. It should nevertheless be understood, however, that other distributed object models, such as the Distributed Component Object Model (DCOM) and the Java Remote Method Invocation (RMI) model may be used in other embodiments of the present invention. The CORBA model is discussed briefly hereafter.

The CORBA model is based on an Object Request Broker (ORB) that acts as an object bus over which objects may transparently interact with one another irrespective of whether they are located locally or remotely. A CORBA server object supports an interface that consists of a set of methods. A particular instance of a CORBA server object is identified by an object reference. The object reference may be used by a CORBA client object to make method calls to the CORBA server object as if the CORBA client object and the CORBA server object shared the same address space. Resources for developing distributed software using CORBA may be obtained from third party software providers.

Returning to FIG. 3, the mediation facilities module 86 may be configured as a set of software objects that are used to represent each resource in the ESD by identifying the resource's name, capabilities, limitations, and any additional relevant characteristics of the resource. Thus, in accordance with embodiments of the present invention, a device, a service model, a customer, a third-party software package, etc., in the ESD 22 may all be represented by respective mediation facilities module 86 software objects. All resources of a given type appear identical to the service management system 24 software once these resources are represented by mediation facilities module 86 objects. In accordance with object oriented design and programming principles, any function or method that can be performed by or on a given resource type can be performed by or on any resource of that type. Advantageously, the mediation facilities module 86 may allow the present invention to manage a service independent of the underlying network technology, as the various network devices are modeled by particular mediation facilities module 86 objects that are associated therewith.

The object manager module 88 may be configured to generate a new mediation facilities module 86 object when a new service is needed and/or when a new device is installed in the ESD 22. The object manager module 88 may be further configured to create associations between mediation facilities module 86 objects. For example, when device interfaces are created in the ESD 22, their linkage to service models, process and connection routing, billing, service support systems (SSS), and other operational support system (OSS) functions may be provided by representing the device interface by a mediation facilities module 86 software object. Similarly, the service management system 24 may utilize third-party software by representing the third-party software by a mediation facilities module 86 software object. For example, a third-party billing system or trouble-ticket system may be linked to all of the device objects from which it receives billing data or problem reports through the CORBA module 82.

The data module 92 may comprise a policy rules database 94 and a resource capabilities database 96. The policy rules database 94 comprises a set of rules for associating service requirements with resources in the ESD 22. The service requirements may comprise requirements associated with a customer/user and/or business requirements associated with a service provider. The resource capabilities database 96 comprises information regarding the capabilities of resources in the ESD 22. In other embodiments of the present invention, the capabilities of resources in the ESD 22 need not be stored in the resource capabilities database 96, but instead may be communicated from the ESD 22 resources to the service management system 24 via, for example, capability reports.

Although FIG. 3 illustrates an exemplary software architecture that may be used for managing a service in accordance with embodiments of the present invention, it will be understood that the present invention is not limited to such a configuration, but is intended to encompass any configuration capable of carrying out the operations described herein.

Computer program code for carrying out operations of the present invention may be written in an object-oriented programming language, such as Java, Smalltalk, or C++. Computer program code for carrying out operations of the present invention may also, however, be written in conventional procedural programming languages, such as the C programming language or compiled Basic (CBASIC). Furthermore, some modules or routines may be written in assembly language or even micro-code to enhance performance and/or memory usage.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

With reference to the block diagram of FIG. 5 and the flowcharts of FIGS. 4 and 6, exemplary operations for managing a service, in accordance with embodiments of the present invention, will be described hereafter.

Figure 4:
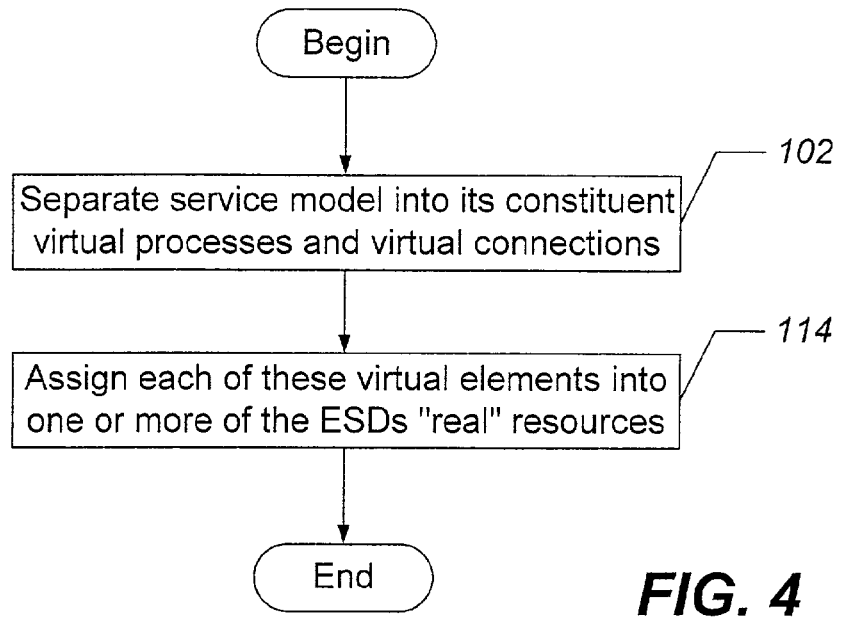
FIG. 4 is a flowchart that illustrates exemplary operations for managing a service in accordance with embodiments of the present invention.

Referring now to FIG. 4, exemplary operations for managing a service begin at block 102 where a service model is generated that comprises separate virtual processes and virtual services. This is illustrated, for example, in FIG. 5 where a virtual service model 104 is populated with user parameters and policies, such as those policies contained in the policy rules database 94 and/or the resource capabilities database 96 discussed hereinabove, as represented by the policy computed service topology map 106 to separate the service model into its constituent virtual connections 108 and virtual processes 112. The virtual connections are information routes through the ESD 22, and the virtual processes are network-resident services, which are represented by the process domain 34 in the ESD 22. Returning to FIG. 4, at block 114, each of these virtual elements, i.e., virtual connections 108 and virtual processes 112, are assigned to one or more of the "real" resources comprising the ESD 22.

Figure 6:
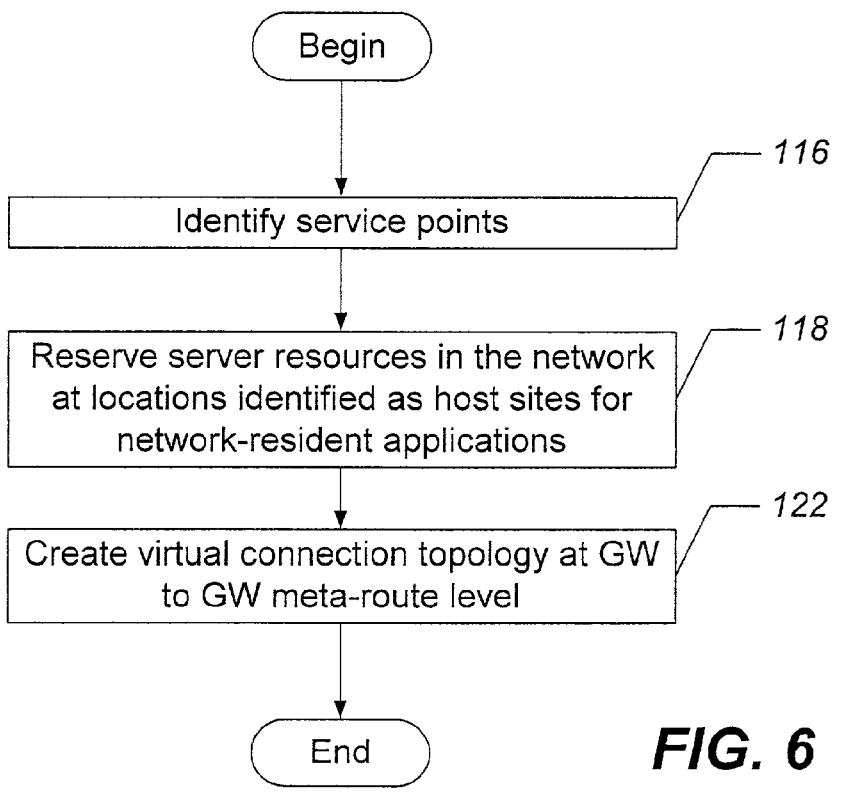
FIG. 6 is a flowchart that illustrates exemplary operations for managing a service in accordance with further embodiments of the present invention.

Referring now to FIG. 6, exemplary operations for managing a service, in accordance with further embodiments of the present invention, begin at block 116 where service points are identified in the ESD 22. Service points correspond to locations/resources in the ESD 22 through which a user accesses the service and/or that host a network process/network-resident application represented by the process domain 34. The service management system 24 may then reserve server resources in the ESD 22 at locations identified as host sites for network-resident applications at block 118. Next, at block 122, a virtual connection topology is created at the meta-route level.

Figure 5:
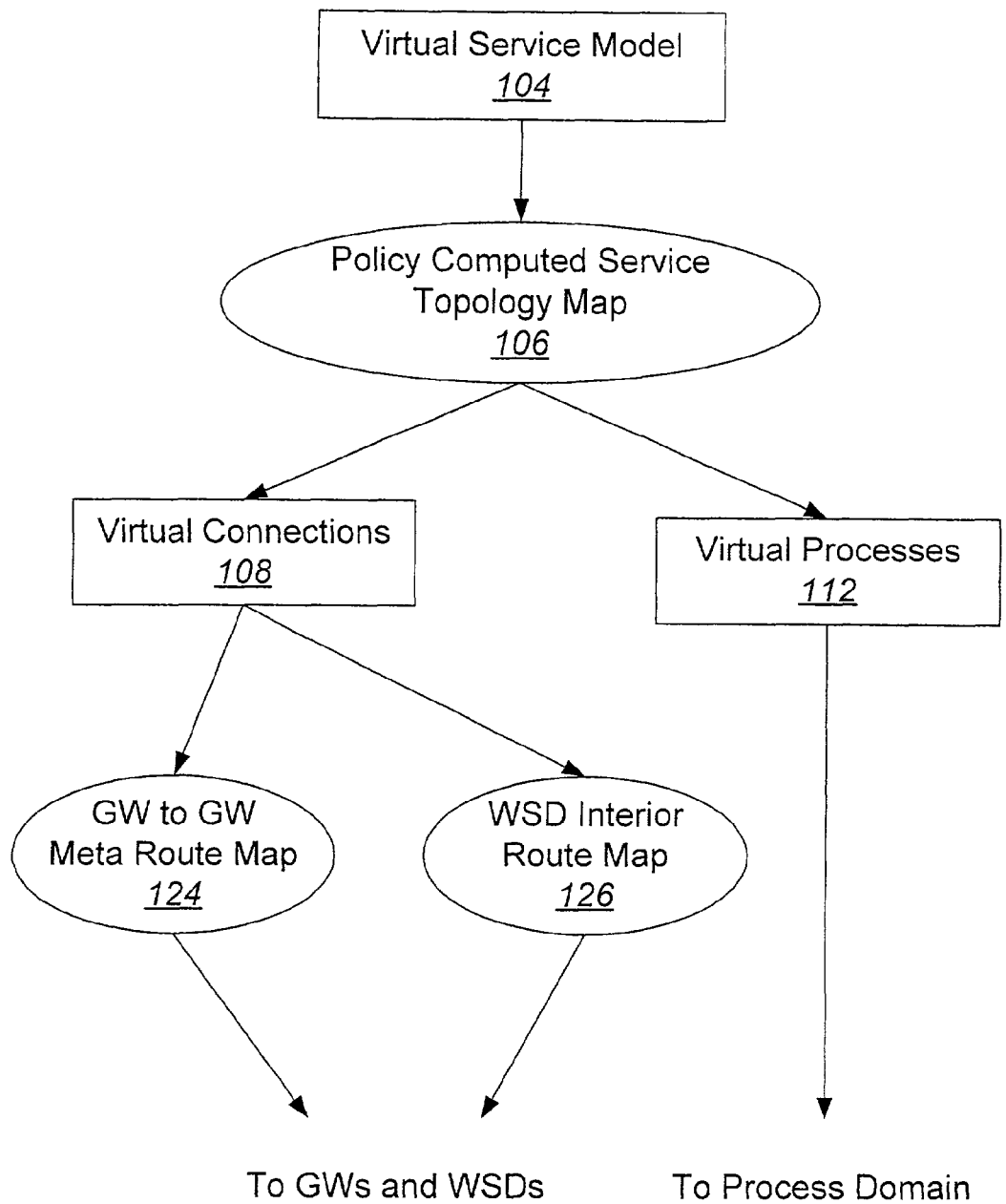
FIG. 5 is a block diagram that illustrates virtual services in accordance with embodiments of the present invention.

As shown in FIG. 5, a GW-to-GW meta-route map 124 may be constructed based on the virtual connections 108 by specifying an ordered list of GWs that defines a route through the ESD 22 for each virtual connection. In addition to the meta-route map 124, a WSD interior route map 126 may also be generated that provides the specific paths between pairs of GWs through single WSDs. In accordance with embodiments of the present invention, the service management system 24 need not generate the WSD interior route maps 126 as GW devices may generate these routes through the individual WSD interiors using protocols associated with the respective WSDs. Thus, the service management system 24 may generate a virtual connection by specifying the hops between GW devices and delegating the responsibility for creating the connections within the respective WSDs to the pairs of GW devices respectively connected by the WSDs.

The flowcharts of FIGS. 4 and 6, and the block diagram of FIG. 5 illustrate the architecture, functionality, and operations of embodiments of the service management system 24 software. In this regard, each block represents a module, segment, or portion of code, which comprises one or more executable instructions for implementing the specified logical function(s). It should also be noted that in some alternative implementations, the function(s) noted in the blocks may occur out of the order noted in FIGS. 4-6. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

I claim:

1. A network model for managing a service, comprising:
an end service domain that associates the service with an end service provider, the end service domain comprising:
a plurality of wholesale service domains, respective ones of the plurality of wholesale service domains comprising at least one network that provides traffic transport for the end service domain;
a plurality of gateways, wherein at least a first one of the plurality of gateways couples one of the plurality of wholesale service domains to another one of the wholesale service domains and is configured to perform protocol translation on traffic passing between the coupled wholesale service domains, and wherein at least a second one of the plurality of gateways is configured to couple a user to the end service domain and is further configured to communicate with the user by a protocol associated with the service;
a process domain that provides an abstract representation of applications provided by the end service domain;
a service management system that is communicatively coupled to the end service domain, the service management system comprising:
a plurality of software objects that represent resources in the end service domain for providing the service; and
a policy database that comprises rules for associating requirements of the service with resources in the end service domain.

2. The network model of claim 1, wherein the requirements of the service comprises:
service requirements associated with the user.

3. The network model of claim 1, wherein the first one of the plurality of gateways is further configured to set up internal connections in the one of the plurality of wholesale service domains.

4. The network model of claim 1, wherein the second one of the plurality of gateways is further configured to analyze incoming user traffic and to segregate the incoming user traffic according to application.

5. A method of managing a service, comprising:
performing operations as follows on at least one processor:
providing an end service domain that comprises a plurality of resources that facilitate delivery of the service;
generating a service model that comprises a plurality of virtual processes and a plurality of virtual connections from the end service domain that are associated with the service;
obtaining information that specifies capabilities of the plurality of resources in the end service domain;
providing a policy database that comprises rules for associating requirements of the service with the plurality of resources; and
assigning the plurality of virtual processes and the plurality of virtual connections to ones of the plurality of resources based on the information that specifies the capabilities of the plurality of resources and the policy database;
wherein the end service domain comprises:
a plurality of wholesale service domains, respective ones of the plurality of wholesale service domains comprising at least one network that provides traffic transport for the end service domain; and
a plurality of gateways, wherein at least a first one of the plurality of gateways couples one of the plurality of wholesale service domains to another one of the wholesale service domains and is configured to perform protocol translation on traffic passing between the coupled wholesale service domains, and wherein at least a second one of the plurality of gateways is configured to couple a user to the end service domain and is further configured to communicate with the user by a protocol associated with the service.

6. The method of claim 5, wherein the requirements of the service comprises:
service requirements associated with the user.

7. The method of claim 5, wherein generating the service model comprises:
identifying service points in the end service domain corresponding to at least one resource through which a user accesses the service and at least one resource that hosts an end service domain application.

8. The method of claim 7, further comprising:
associating respective ones of the plurality of virtual connections with respective ones of a plurality of ordered lists of the gateways that define routes through the end service domain.

9. The method of claim 8, further comprising:
associating respective ones of the plurality of virtual connections with respective ones of a plurality of routes within the wholesale service domains.

10. A system for managing a service, comprising:
a processor; and
a non-transitory computer readable storage medium connected to the processor and comprising computer readable program code that when executed by the processor causes the processor to perform operations comprising:
providing an end service domain that comprises a plurality of resources that facilitate delivery of the service;
generating a service model that comprises a plurality of virtual processes and a plurality of virtual connections from the end service domain that are associated with the service;
obtaining information that specifies capabilities of the plurality of resources in the end service domain;
providing a policy database that comprises rules for associating requirements of the service with the plurality of resources; and
assigning the plurality of virtual processes and the plurality of virtual connections to ones of the plurality of resources based on the information that specifies the capabilities of the plurality of resources and the policy database;
wherein the end service domain comprises:
a plurality of wholesale service domains, respective ones of the plurality of wholesale service domains comprising at least one network that provides traffic transport for the end service domain; and
a plurality of gateways, wherein at least a first one of the plurality of gateways couples one of the plurality of wholesale service domains to another one of the wholesale service domains and is configured to perform protocol translation on traffic passing between the coupled wholesale service domains, and wherein at least a second one of the plurality of gateways is configured to couple a user to the end service domain and is further configured to communicate with the user by a protocol associated with the service.

11. The system of claim 10, wherein the requirements of the service comprises:
service requirements associated with the user.

12. The system of claim 10, wherein generating the service model comprises:
identifying service points in the end service domain corresponding to at least one resource through which a user accesses the service and at least one resource that hosts an end service domain application.

13. The system of claim 12, wherein the operations further comprise:
associating respective ones of the plurality of virtual connections with respective ones of a plurality of ordered lists of the gateways that define routes through the end service domain.

14. The system of claim 13, wherein the operations further comprise:
associating respective ones of the plurality of virtual connections with respective ones of a plurality of routes within the wholesale service domains.

15. A computer program product for managing a service, comprising:
a non-transitory computer readable storage medium having computer readable program code embodied therein, the computer readable program code comprising:
computer readable program code for providing an end service domain that comprises a plurality of resources that facilitate delivery of the service;
computer readable program code for generating a service model that comprises a plurality of virtual processes and a plurality of virtual connections from the end service domain that are associated with the service;
computer readable program code for obtaining information that specifies capabilities of the plurality of resources in the end service domain;
computer readable program code for providing a policy database that comprises rules for associating requirements of the service with the plurality of resources; and
computer readable program code for assigning the plurality of virtual processes and the plurality of virtual connections to ones of the plurality of resources based on the information that specifies the capabilities of the plurality of resources and the policy database;
wherein the end service domain comprises:
a plurality of wholesale service domains, respective ones of the plurality of wholesale service domains comprising at least one network that provides traffic transport for the end service domain; and
a plurality of gateways, wherein at least a first one of the plurality of gateways couples one of the plurality of wholesale service domains to another one of the wholesale service domains and is configured to perform protocol translation on traffic passing between the coupled wholesale service domains, and wherein at least a second one of the plurality of gateways is configured to couple a user to the end service domain and is further configured to communicate with the user by a protocol associated with the service.

16. The computer program product of claim 15, wherein the requirements of the service comprises:
service requirements associated with the user.

17. The computer program product of claim 15, wherein the computer readable program code for generating the service model comprises:
computer readable program code for identifying service points in the end service domain corresponding to at least one resource through which a user accesses the service and at least one resource that hosts an end service domain application.

18. The computer program product of claim 17, further comprising:
computer readable program code for associating respective ones of the plurality of virtual connections with respective ones of a plurality of ordered lists of the gateways that define routes through the end service domain.

19. The computer program product of claim 18, further comprising:
computer readable program code for associating respective ones of the plurality of virtual connections with respective ones of a plurality of routes within the wholesale service domains.

* * * * *